April 12, 1960     B. CARLIN     2,932,189
ULTRASONIC FLAW DETECTOR
Filed Oct. 12, 1956
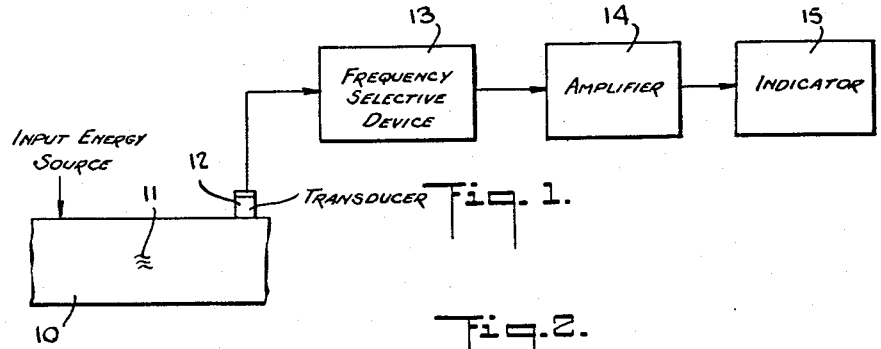
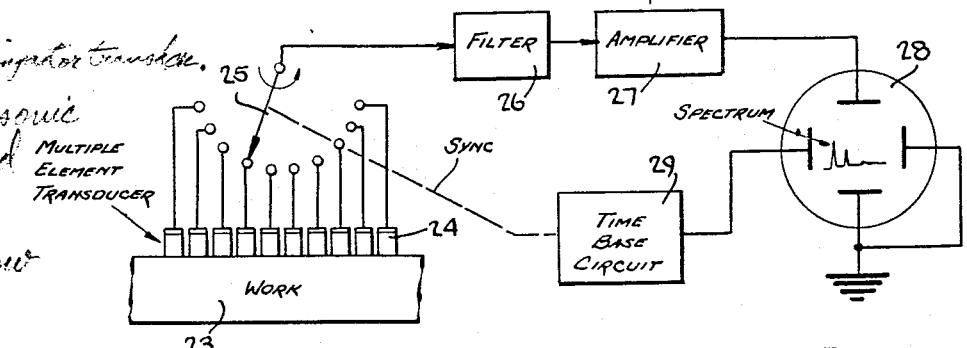
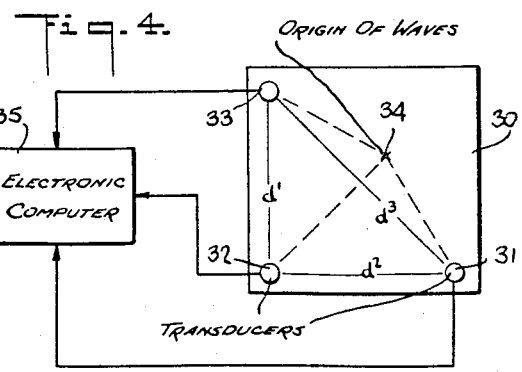
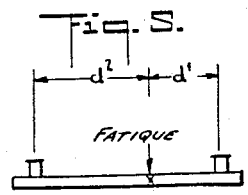
INVENTOR.
BENSON CARLIN
BY
ATTORNEYS

United States Patent Office 2,932,189
Patented Apr. 12, 1960

2,932,189

ULTRASONIC FLAW DETECTOR

Benson Carlin, Fair Lawn, N.J., assignor to Alcar Instruments, Inc., Little Ferry, Mich., a corporation of New Jersey Application October 12, 1956, Serial No. 615,555

7 Claims. (Cl. 73—67.7)

My invention relates generally to flaw detection techniques and more particularly to a novel ultrasonic method and apparatus for detecting and locating the presence of structural defects in solids. This application is a continuation-in-part of my pending patent application Serial No. 515,851, filed June 16, 1955, now abandoned.

It is known to detect inhomogeneities of density or elasticity in materials by feeding ultrasonic pulses into the article under inspection, the respective time intervals of the arrival of the direct and reflected pulses being determined at one or more receiving stations on the surface of the article. In this connection, reference is made to the patent to Firestone 2,280,226, issued on April 21, 1942, for "Flaw Detecting Device and Measuring Instrument."

With the pulse-reflection method it is possible for example to sense the presence of a crack in a casting, even though the crack lies entirely within the casting and is not visible on the surface. Such internal flaws may also be detected by standard X-ray techniques. Another known form of inspection, which is limited to ferrous materials, is the magnaflux method wherein the part is magnetized and covered with a fine magnetic powder, the powder gathering in the vicinity of a crack by reason of a disturbance in the magnetic flux path. With non-magnetic materials other procedures are used, such as the Zylgo method in which the part is immersed in a specially activated penetrating oil and viewed under black light.

Conventional testing methods, such as the X-ray technique or the pulse-reflection technique, are capable only of detecting flaws which assume the tangible form of a microscopic fissure or an actual rupture in the material. These techniques are not adapted to detect defects which come into being prior to the formation of crevices in the material. They give no warning with respect to incipient fatigue conditions which may lead abruptly to failure. Fatigue failure is particularly dangerous, for the final rupture may occur with disastrous suddenness in high speed machinery or vehicles.

Fatigue has reference to the failure of materials under the action of repeated stresses. It is responsible for a large proportion of the failures occurring in machine parts. Thus no matter how carefully the component parts of an aircraft are tested by conventional techniques prior to their asssembly, such tests afford no indication of defects which may arise unexpectedly when the aircraft is in flight and the parts are subjected to repeated stresses. When fatigue will take place cannot be determined in advance.

Fatigue failure is the result of a slip occurring along certain crystallographic directions accompanied by local crystal fragmentation rupturing the atomic bonds. This leads to the formation of sub-microscopic cracks which soon become visible cracks. Existing flaw-detection devices are insensitive to fatigue in its early stages and do not respond unless the fatigue has progressed to the point where a physical discontinuity has developed which will reflect an ultrasonic pulse or which can be rendered visible by X-ray examination.

In view of the foregoing, it is the primary object of the present invention to provide a novel ultrasonic technique and apparatus for detecting the presence of fatigue in its incipient condition. The instrument in accordance with the invention is sensitive to changes in grain structure in material under test and is also capable of detecting internal flaws which assume the tangible form of cracks or holes in the material.

Also an object of the invention is to provide multiple detector apparatus capable of locating the site of a structural defect.

I have discovered that when relatively low frequency energy is fed into an article or the article is set into vibration, in the event a fatigue defect exists therein, ultrasonic energy will be generated at the site of the defect whose frequency is at variance with the natural frequency of the material and may therefore be selectively detected. The excitation of the material may be effected artificially by a transducer or may be produced by shock waves transmitted to the part under test by a reciprocating engine, a jet engine or other means.

For a better understanding of the invention, as well as other objects and further features thereof, reference is made to the following detailed description to be read in connection with the accompanying drawing, wherein—

Figure 1 is a schematic diagram of an ultrasonic testing device in accordance with the invention.

Figure 2 illustrates diagrammatically a gun barrel testing arrangement, in accordance with the invention.

Figure 3 shows a spectrum analyzer for flaw detection.

Figure 4 is a schematic diagram of a multiple pick-up arrangement for locating the site of a flaw.

Figure 5 is a side view of the device in Fig. 4.

Referring now to the drawing, and more particularly to Fig. 1, there is shown an article 10 under test, the article having a defect or flaw therein represented by mark 11. This defect may be constituted by sub-microscopic fissures resulting from incipient fatigue or by larger cracks within the interior of the body arising from a more advanced condition of fatigue.

Shock waves are imparted to the article 10 to set it into vibration at its natural frequency. This vibratory action may be produced artificially by coupling a sending transducer to the article or it may occur as a result of vibrations or mechanical shock when the article forms part of an engine or other motor device.

The presence of a flaw in the article gives rise to the production of high frequency or ultrasonic frequency components originating at the site of the flaw. The frequency of the wave energy originating at the site of the flaw is distinctly different from the vibratory frequency of the article and may be selectively detected. This is accomplished for example by a pick-up transducer which may take the form of a piezo-electric crystal or a variable reluctance device 12 which is mechanically in contact with the article 10, thereby producing an output voltage. This voltage is fed through a filter circuit 13 to a suitable amplifier 14. The filter may be constituted by a resistance-capacitance network adapted to discriminate against the relatively low frequency waves produced in the article 10. The output of the amplifier is supplied to a suitable indicator 15, such as a vacuum tube voltmeter or an oscilloscope. By an examination of the waveform of the energy produced on the screen of the oscilloscope, the nature of the defect in the material may be analyzed. The absence of an output from the amplifier indicates of course a lack of flaws in the material.

Referring now to Fig. 2, there is shown a diagrammatic representation of a gun barrel 16 at one end of which, designated by reference numeral 17, a firing action takes place. This firing action produces a shock wave which starts at point 17 at the one end of the barrel and gradually progresses to a point 18 adjacent the other end of the barrel. A transducer 19 contacts the barrel at point 18, the output of the transducer being fed through a filter 20 to an amplifier 21 whose output is connected to an indicator 22.

The transducer circuit operating in conjunction with the barrel in Fig. 2 is identical to that shown in Fig. 1 and is sensitive only to ultrasonic energy. From the nature of the ultrasonic frequency components which are present and the intensity thereof, structural flaws in the barrel may be analyzed. Moreover, the time interval between the firing of the gun and the pick-up of ultrasonic energy may be used to locate the flaws. The means to determine the time interval between the setting off of the shock wave and the receipt of an ultrasonic signal, may be of the type shown in the above-identified Firestone patent, or of the type illustrated in Fig. 3, making use of a cathode ray tube in conjunction with a time base circuit wherein the displacement between pulses displayed on the screen of the cathode ray tube is indicative of the time interval therebetween. Similar phenomena will take place in rocket engines, jets, reciprocating engines, etc. In all of these devices the nature of the activity is such as to cause a shock wave to travel along the various parts thereof, and this shock wave may serve as a basis for a test as herein disclosed.

As presently understood, the generation of ultrasonic frequency components at the grain boundaries of the material under test is the result of a step action with respect to the travelling shock wave. As distinguished from prior techniques, the flaw detector in accordance with the invention affords an indication not of the wave energy propagated through the material but of the ultrasonic energy emanating from the site of a defect.

A spectrum analysis of the ultrasonic wave energy developed by flaws in the article under inspection is possible with the arrangement shown in Fig. 3. The piece 23 to be tested is set into vibration, ultrasonic waves generated at flaws in the piece being intercepted by a multiple element transducer 24. The various elements of the transducer are isolated from each other and lie in contact with piece 23 at closely spaced positions thereon. Thus as the shock wave travels along the piece, ultrasonic signals are generated therein wherever a flaw exists.

Each element of the transducer 24 is connected to one fixed contact of a rotary commutator switch 25 whose moving contact is connected through a filter 26 and an amplifier 27 to one set of deflection plates of a cathode-ray indicator 28. When the moving contact rotates, the fixed contacts are sequentially engaged. Thus the respective outputs of the transducer elements are successively scanned by the commutator switch 25 and applied to the indicator 28 to effect vertical deflection of the cathode ray beam. A time base circuit 29 of conventional design is coupled to the horizontal deflection plates of the cathode-ray tube simultaneously to provide horizontal deflection of the beam, the time-base circuit operation being synchronized with the commutator 25. It is to be understood that electronic switching circuit may be used in lieu of the commutator switch, and that magnetic deflection may be used in place of the electrostatic plates shown. The electronic commutator switch may be constituted by a conventional cathode ray tube beam switching device in which a beam is deflected to intercept an array of electrodes, or it may be constituted by a series of successively actuated vacuum tube circuits.

In operation, displayed on the fluorescent screen of the cathode-ray tube along a base line thereon is a series of pulses, each representing the output of a respective transducer element. In this manner a spectrum analysis of the work piece is provided.

To determine the site of a flaw, three transducer pick-up posts may be arranged at spaced positions on the object under inspection in the manner shown, for example, in Figs. 4 and 5. The piece 30 under test is represented as having a substantially square area, the transducers 31, 32 and 33 being disposed at three corners of the piece. The site of the flaw is represented at the point designated by numeral 34.

It is known that the difference in the times at which a signal is heard at two listening posts is proportional to the difference of the distances from the posts to the point of emanation of the signal. Hence, this point is known to lie on a certain hyperbola. A third listening point will afford another hyperbola and the point of emanation lies at the intersection of the two curves. In this connection reference is made to page 93 of the text "Analytic Geometry," 2nd edition, by F. H. Steen and D. H. Ballou.

The computation for determining the site would run as follows: Assuming a piece of more or less square area, as shown in Fig. 4, the quadrant in which the point lies would be determined by the relative magnitude of the vectors connecting the point and the transducers. Two equations may then be set up whose simultaneous solution would give the point. Since the time at which the signal starts is not known but only the difference between the reception at several points, we therefore know that the point will lie on the hyperbola with respect to the transducer. This is known because the hyperbola represents a curve whose difference between two points is a constant. The difference consequently defines the hyperbola. The simultaneous equations for this hyperbola may be found in the above-cited test.

The solution of the equations and the determination of the site of the flaw may be carried out by standard electronic computer apparatus as represented by block 35 in Fig. 4. In this connection note the text "High-Speed Computing Devices," Engineer Research Associates, McGraw Hill Book Company, 1950, and in particular chaper 7, division 5, sections 5 and 6.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Ultrasonic apparatus for detecting the presence of flaws in material under test comprising means to impart relatively low-frequency vibrations to the material, a pick-up transducer adapted to contact said material to intercept ultrasonic vibrations originating at a flaw therein thereby to produce an output voltage, an indicator coupled to said transducer to measure the time interval between the initiation of said low-frequency vibrations and the generation of said output voltage, and filtering means interposed between said transducer and said indicator to discriminate against frequencies other than those emanating from said flaw.

2. Ultrasonic apparatus for detecting the presence of flaws in material under test, said material being subject to a low frequency vibratory shock action, comprising a transducer adapted to contact said material and tuned to intercept ultrasonic vibrations originating at a flaw therein and to discriminate against said low frequency vibrations thereby to produce an output signal, and an indicator coupled to said transducer to measure the time difference between the shock action and the output signal thereby to mark the presence of flaws.

3. Ultrasonic apparatus for detecting the presence of flaws in material subjected to a low-frequency vibratory shock action causing a low-frequency shock wave to travel thereon whereby an ultrasonic signal whose frequency is at variance with said shock wave is generated at the site of a flaw, said apparatus comprising a pick-up transducer contacting said material and adapted to intercept said ultrasonic signal, an indicator coupled to said pick-up transducer and adapted to measure the time difference between said shock action and said signal, and a filter network interposed between said pick-up transducer and said indicator to discriminate against said shock wave.

4. The method of detecting and locating flaws in solid objects comprising the steps of imparting relatively low frequency vibrations to said object whereby ultrasonic signals are generated at the site of a flaw, selectively intercepting said ultrasonic signals at a plurality of spaced posts on said object, and electrically measuring the time difference between the reception of said signals at respective posts to fix the site of said flaw.

5. Ultrasonic spectrum analysis test apparatus comprising means to impart relatively low-frequency vibrations to a workpiece, a multiple-element transducer, each element of which is isolated from every other element, said transducer being engageable with said work piece whereby said elements are spaced therealong, and means simultaneously to exhibit the outputs of said elements to indicate the time displacements among the outputs of said elements, said elements being adapted selectively to intercept only ultrasonic energy originating at the sites of defects in said piece.

6. Apparatus as set forth in claim 5, wherein said exhibit means is constituted by a cathode-ray oscilloscope tube to whose deflection means said outputs are successively applied in synchronism with a time base voltage.

7. Apparatus for locating the site of a defect in a work piece subjected to low-frequency vibratory stresses whereby ultrasonic signals emanate from the site of a defect, said apparatus comprising three pick-up transducers mounted on said piece and tuned to intercept said ultrasonic signals, and computer means coupled to said transducers to measure the time displacement between the reception of the signals at the first and second transducers and between the second and third transducers thereby to fix the site of said defect.

References Cited in the file of this patent

UNITED STATES PATENTS

| | | |
|---|---|---|
| 2,280,226 | Firestone | Apr. 21, 1942 |
| 2,403,999 | Read et al. | July 16, 1946 |
| 2,533,499 | Munson | Dec. 12, 1950 |
| 2,571,409 | Beyers et al. | Oct. 16, 1951 |
| 2,721,315 | Snyder | Oct. 18, 1955 |
| 2,799,015 | Bell | July 9, 1957 |

UNITED STATES PATENT OFFICE

CERTIFICATE OF CORRECTION

Patent No. 2,932,189     April 12, 1960

Benson Carlin

It is hereby certified that error appears in the above numbered patent requiring correction and that the said Letters Patent should read as corrected below.

In the grant, lines 2 and 3, address of the assignee, for "Little Ferry, Michigan" read -- Little Ferry, New Jersey --; in the heading to the printed specification, line 4, for "Little Ferry, Mich." read -- Little Ferry, N. J. --.

Signed and sealed this 13th day of September 1960.

(SEAL)
Attest:

KARL H. AXLINE
Attesting Officer

ROBERT C. WATSON
Commissioner of Patents